No. 861,486.

PATENTED JULY 30, 1907.

A. UNDERWOOD.
PRESSURE REGULATOR.
APPLICATION FILED APR. 30, 1907.

8 SHEETS—SHEET 1.

Witnesses
G. R. Thomas
W. A. N. Redmond

Inventor
Arthur Underwood
By
J. F. Beale
Attorney

No. 861,486. PATENTED JULY 30, 1907.
A. UNDERWOOD.
PRESSURE REGULATOR.
APPLICATION FILED APR. 30, 1907.

3 SHEETS—SHEET 2.

Witnesses
G. R. Thomas
W. A. N. Edmond

Inventor
Arthur Underwood
By
J. F. Beale
Attorney

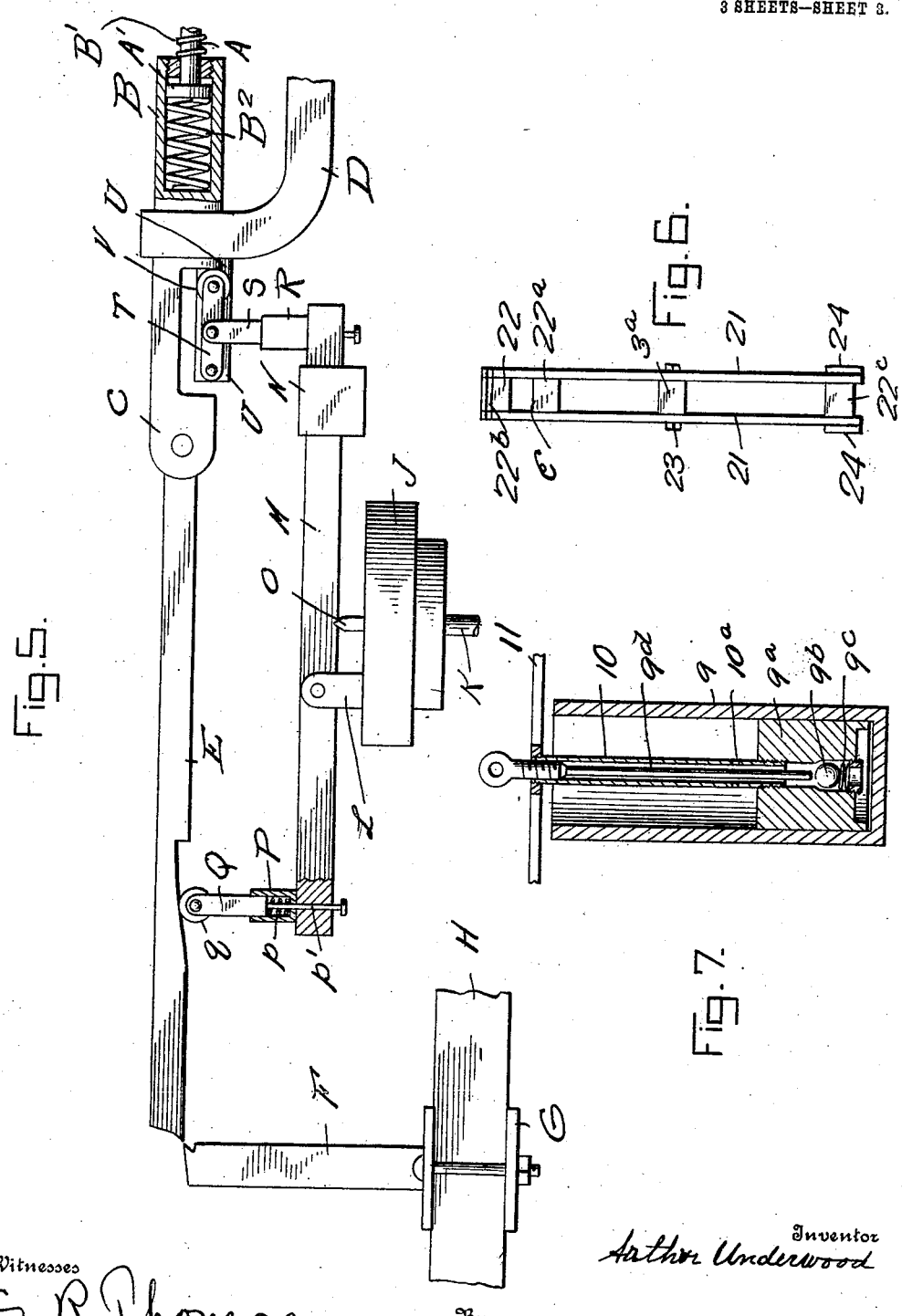

UNITED STATES PATENT OFFICE.

ARTHUR UNDERWOOD, OF WASHINGTON, DISTRICT OF COLUMBIA.

PRESSURE-REGULATOR.

No. 861,486.　　　　Specification of Letters Patent.　　　Patented July 30, 1907.

Application filed April 30, 1907. Serial No. 371,101.

*To all whom it may concern:*

Be it known that I, ARTHUR UNDERWOOD, a citizen of the United States, residing at Washington, in the District of Columbia, have invented certain new and useful Improvements in Pressure-Regulators for Steam-Pumps, of which the following is a specification.

My invention relates to pressure regulators for steam pumps, and more particularly to that class of regulators employed to govern the pressure in water pressure tanks or stand pipes.

My invention is shown as applied to a steam pump and pressure tank for operating an hydraulic elevator though I do not confine myself to this application.

Heretofore in pressure regulators for steam pumps no provision has been made, when there is a slight leak between the water cylinder and pump plunger, to prevent the pump from creeping or moving back and forth when the elevator is not running, thus wasting steam and causing wear upon the pump. Leaking of this character in the water cylinder is constant where a solid plunger is used and occurs where a packed plunger is used when the packing is not perfectly tight.

Now the object of my invention is to provide a pressure regulator and cut-off which will prevent said creeping movement of the pump regardless of the amount of leak in water cylinder by positively cutting off the steam supply to the pump as soon as the water pressure reaches normal.

It is also my object to provide a pressure regulator wherein I dispense with the necessity of closing the steam supply valve by direct pressure either from the tank or boiler and employ instead a positive cut-off gear operated by the pump mechanism to close said valve. Said cut-off gear being controlled by an independent gear operated by the tank pressure; thereby effecting a quicker action of the valve in cutting off and allowing the valve to remain wide open until the tank pressure reaches normal or working pressure.

It is also my object to provide a pressure regulator having means for governing the rapidity at which the valve opens, and one in which the parts are of simple construction, accessible, and easily adjusted.

Figure 1:
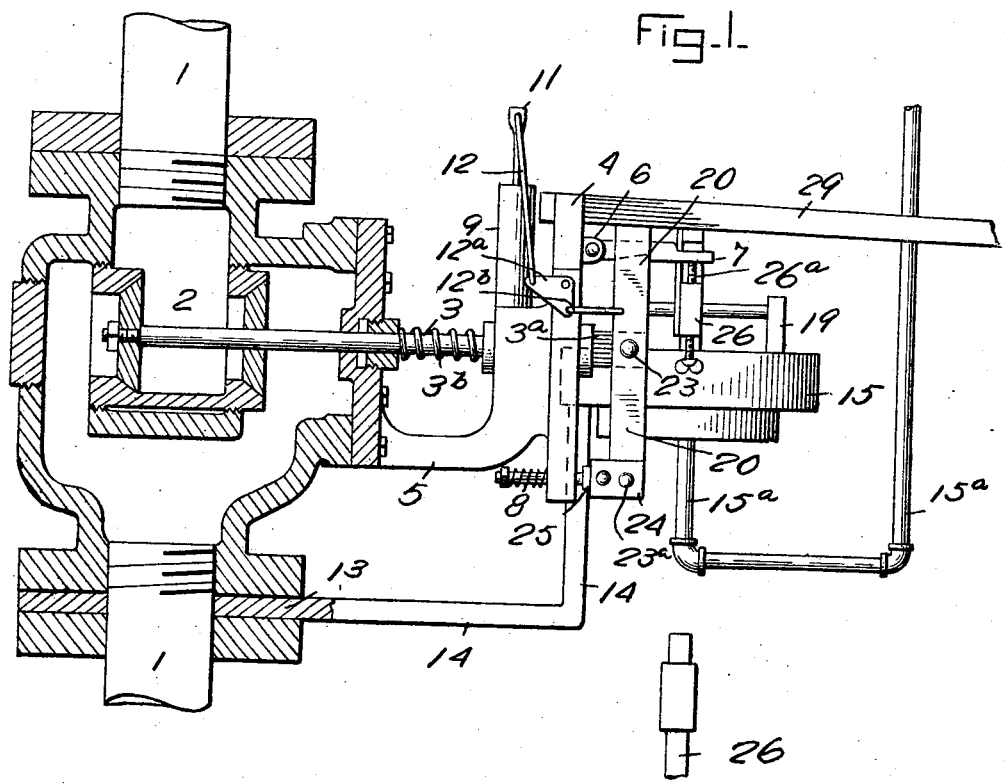
Figure 2:
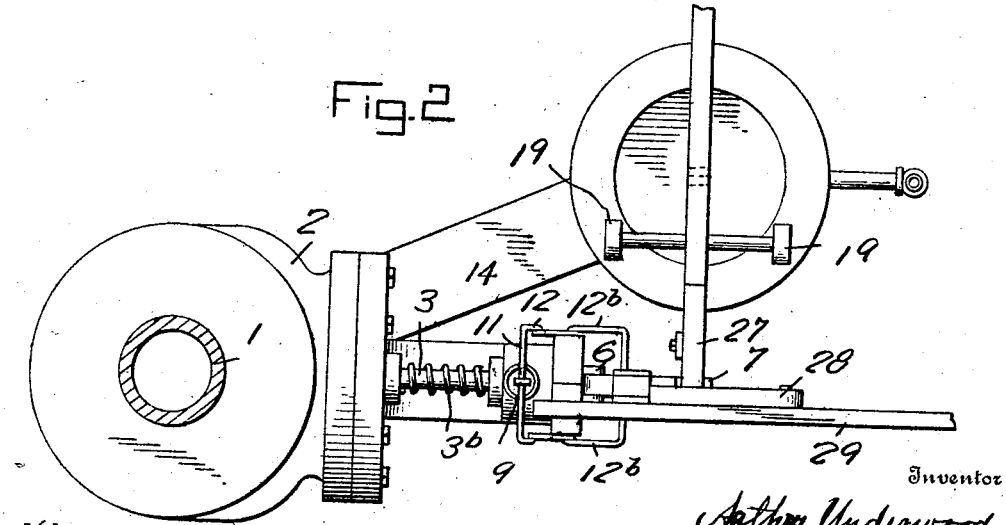
Figure 3:
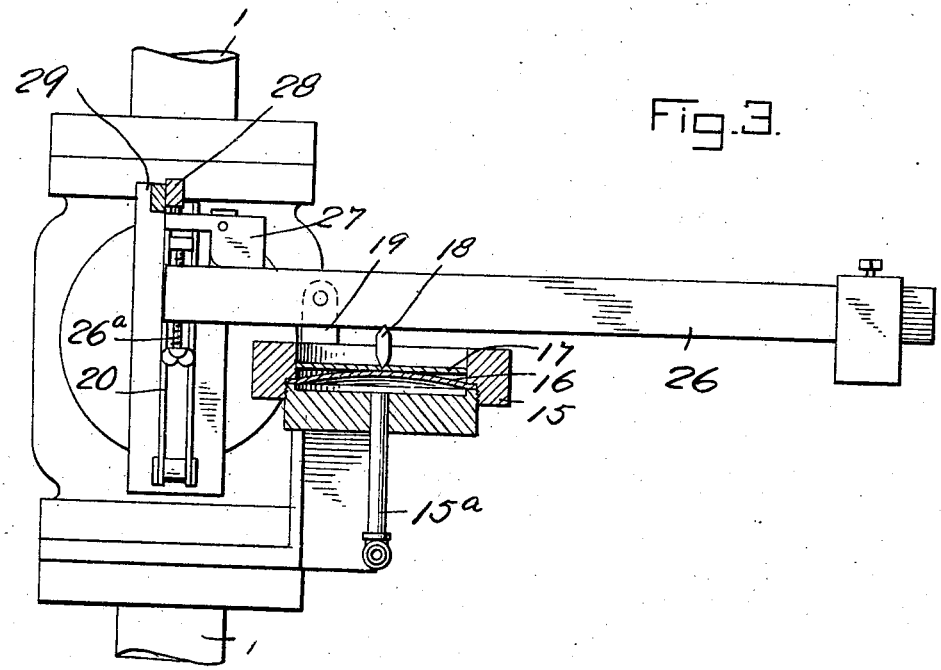
Figure 4:
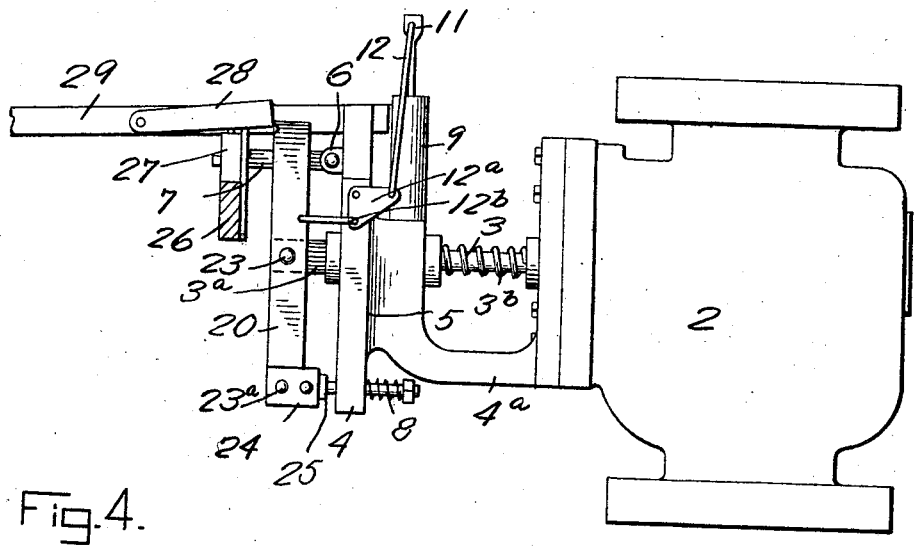

In the accompanying drawings forming a part of this specification Figure 1, is a side elevation of my invention, the valve being in section, the steam pump and pressure tank being omitted. Fig. 2, is a top plan view. Fig. 3, is an end view. Fig. 4 is a side elevation taken from the side opposite to that shown in Fig. 1, the diaphragm and its attachments being omitted.
Fig. 5, is a side elevation of a modification of my invention. Figs. 6, and 7, are detail views.

Referring more particularly to the drawings, 1 denotes the steam feed pipe of the pump. 2, a valve of the balance type inserted in the line of pipe. 3, denotes the stem of said valve projecting through the casing. $3^a$, an extension of said stem and $3^b$, a coiled spring on said stem for unseating said valve.

4 denotes a vertical pillow having an offset or bracket 5 cast integral with the valve flange or head. Said pillow has a slot or guideway formed in its upper end for passage of a rod 29 hereinafter described. 6 denote lugs formed on the face of said pillow. 7 a gravity latch pivoted to a bolt passing through said lugs. Said pillow is provided midway of its length with an opening for the passage of the valve stem extension $3^a$ and an opening at its lower end for the passage of a spring actuated rod 8.

9 denotes a vertically arranged dash-pot secured to the bracket 5. Said dash-pot is shown in detail in Fig. 7 in which $9^a$ denotes the piston having a central bore which is enlarged at its lower end to accommodate a ball $9^b$ and spring $9^c$, the ball being of a size to close the passage to the smaller bore and bearing upon a rod $9^d$ which serves to adjust the position of the ball against the pressure of said spring; said rod is threaded near its upper end and terminates in a head for convenience in adjusting it. 10 denotes a hollow dash-rod internally threaded at its upper end to receive said rod and externally threaded to receive a yoke 11; the lower end of the dash-rod is threaded externally and enters the upper end of the internally threaded bore in piston $9^a$. Above its threaded end the dash-rod is provided with ports $10^a$ for passage of the oil the flow of which may be facilitated or retarded by adjusting the rod $9^d$. 12 denote links pivotally mounted at each end to said yoke.

13 denotes a collar bolted in the line of feed pipe to the lower flange of the valve-case and having cast integral a rectangular arm 14 and an upper member of a diaphragm casing 15. $15^a$ denotes a pipe connecting said diaphragm with the water pressure tank.

16 denotes the diaphragm, 17 a metal plate resting loosely thereon, and 18 a double edged fulcrum, its lower edge resting loosely in a groove in said plate.

19 denote standards cast integral with casing 15.

20 denotes an arm composed of two side pieces 21, as shown in Fig. 6, having riveted between them two rectangular steel blocks or head pieces 22, $22^a$ leaving a space between them, the upper block 22 having a horizontal V-shaped groove $22^b$. The space between said blocks affords a passage way for the latch 7. Arm 20 is connected to the dash-pot through links $12^b$, bell cranks $12^a$ and links 12 before mentioned.

$22^c$ denotes a strengthening block riveted between side pieces 21 at the foot of the arm. 23 denotes a bolt loosely mounted in said side pieces at a point midway between the upper edge of block $22^a$, said edge being lettered E, and a bolt $23^a$ shown in Figs. 1 and 4. This latter bolt is loosely mounted in said side pieces. The bolt 23 is pivotally mounted to the valve stem extension $3^a$; thus the arm 20 is hinged on the valve stem about midway of its length. The lower end of said arm is also pivotally mounted on each side in two links 24 and said links are pivotally mounted in a head 25 placed between said links, said head being an integral part of rod 8. Arm 20 as thus mounted pivotally at its center and lower end will assume the following positions as its upper end is pushed toward the pillow 4 its middle portion pushes back the valve stem until the valve is seated. The valve being seated and steam cut off, the upper end of the arm, influenced by steam expansion in the pump cylinder, continues to move back until the latch 7 drops; simultaneously the lower end of arm 20 is moved forward throwing the tension of the spring actuating rod 8 on the valve stem, thereby holding the valve closed until the latch is tripped as hereinafter described.

On standards 19 is journaled a weighted lever 26 its under side bearing on the fulcrum 18 and its inner end projecting under and in the path of latch 7. $26^a$ denotes an adjusting screw on the inner end of said lever; 27 a gravity fender pivoted to a stud on lever 26 its fall being limited by said lever on the top of which it rests when not held down by a gravity pawl 28 hereinafter described.

29 denotes a rod fastened at one end to a reciprocating part of the pump mechanism such as for example the rock-shaft arm, the free end of said rod riding in a slot in pillow 4.

28 denotes a gravity pawl pivoted to one side of rod 29 its free end pointed toward the V-shaped notch $22^b$ in arm 21 and bearing upon the free end of fender 27 upon which it rides.

The operation is as follows: Arm 20 being thrown forward by the opening of valve 2 the pump starts, moving rod 29 back and forth; pawl 28 retaining the position above mentioned relative to arm 20 during said reciprocating action of rod 29, its pawl 28 being fended from contact with the V-shaped notch by fender 27. Now when the elevator stops the pressure in water pressure tank increases and lifts the diaphragm thereby lifting the weighted end of lever 26, lowering its opposite end carrying fender 27 on which pawl 28 rests, thus lowering pawl 28 sufficiently to cause its free end to strike in the V-shaped notch in arm 20, thrust the arm back and thus close the valve. When pawl 28 engages in the notch and moves back it bears down on the fender 27 causing its free end to give as the fender turns on its pivot. After the valve is closed and held by the spring on rod 8 the expansion of steam will cause rod 29 to move back from arm 20 and release pawl 28 from said notch; as this occurs the pivoted fender will return to its normal position by gravity lifting pawl 28 to the position it assumes when the pump is working. Should further expansion of steam occur and rod 29 move toward arm 20 the pivoted fender having now assumed its normal position, as when the pump is working, will fend off pawl 28 and prevent it striking the V-shaped notch. Thus arm 20 is left free to be thrown forward as soon as latch 7, which now holds it, is lifted by lever 26. It is evident the inner end of lever 26, which bears on latch 7, is lifted by the weight at its opposite end as soon as the tank pressure drops. As the elevator starts the pressure in pressure tank drops and the diaphragm falls causing weight to actuate said lever.

To prevent valve 2 from opening suddenly I provide a dash-pot and connect it with arm 20. I also provide means for regulating the action of the dash-pot herein before described whereby I govern the rapidity at which the valve opens.

For the regulator valve I employ a balance valve in which the pressure of steam on the valve stem aided by the pressure of the spring $3^c$ would be sufficient to open the valve after it is unseated; the unseating of the valve being effected by said spring. It will be seen that the normal or working pressure of the pressure tank can be regulated by adjusting the weight on lever 26; to set the weight for a higher pressure it is moved outwardly and for a lower pressure inwardly or toward the latch 7. The adjusting screw at end of lever 26 serves to regulate the pressure at which the valve opens.

In the modification of my invention shown in Fig. 5 I dispense with the use of the arm 20 hinged to the valve stem and the latch 7 and simplify the construction and arrangement of the cut-off gear. With this modification I use the same character of valve as shown in Fig. 1 and therefore do not again show the valve but show the valve stem A, having a headed end A', inclosed in a cylinder B, a spring B' for unseating the valve, and a spring $B^2$ inclosed in cylinder B for holding the valve seated and take up any variation in the stroke of the pump. C denotes the valve stem extension passing through bracket D said bracket being formed integral with the valve-casing not shown. E denotes a rod hinged to the extension C its outer or free end being beveled and terminating in a knife edge to register with a V-shaped notch formed in the upper end of a vertical arm F. G denotes a clamp detachably secured to the valve rod H of a pump and to arm F and serving to adjust arm F lengthwise of rod H. J denotes a diaphragm chamber connected by pipe K to a pressure tank not shown. The diaphragm casing is provided with standards L on which is hinged a lever M having a weight N. Said lever bears on a knife edge fulcrum O which fulcrum bears by a like edge on a plate resting on the diaphragm. The outer end of lever M is provided with a cylindrical support P inclosing a spring $p$ and adjustable screw $p'$. Q denotes a standard entering said support P and bearing upon said spring, the screw $p'$ serving to adjust said standard. At the end of said standard is placed a friction wheel $q$ which bears upwardly on a slanting recess in the lower side of rod E. S denotes a like standard entering a like cylinder R at the opposite end of said lever and is similarly supported and adjusted. At the upper end of standard S is pivoted an arm T which arm is pivoted at one end to a horizontal pillow U formed integral with bracket D—. On the free end of arm T I arrange a friction wheel V which, when the valve is closed, bears against the shoulder W. It is evident that the operation is the same as before described viz: When the tank pressure decreases below normal the diaphragm lowers and lowers the weighted end of lever causing standard S to pull down arm T and cause wheel V to pass under shoulder W and ride on the under side of said shoulder. Simultaneously the opposite end of the lever rises and causes standard Q to push up the free end of rod E and hold it out of the path of arm F while the tank pressure is below normal or while the pump is working. When pressure in tank reaches normal the diaphragm lifts the weighted end of lever and lowers the opposite end bringing rod E in the path of arm F thus placing it to receive a thrust from the valve rod through arm F thereby forcing rod E to close the valve. As this occurs the weighted end of lever rises and standard S and arm T assume the position shown with the wheel V bearing against the shoulder W holding the valve closed.

I do not limit myself to the form of valve shown and described as valves of other types may be employed with advantage when used in combination with my cut-off gear.

Having thus described my invention what I claim and desire to secure by Letters Patent is:

1. A pressure regulator and cut-off for steam pumps consisting of a steam supply valve opening automatically, and an automatic cut-off gear operated by the pump mechanism to close said valve said gear comprising a connection with the pump mechanism, a detachable connection to the stem of said valve and means connected to and actuated by the source of water pressure for automatically engaging and detaching said gear to and from the valve stem.

2. A pressure regulator and automatic cut-off for steam pumps consisting of a valve of the balance type means for automatically opening the valve and an automatic cut-off gear operated by the pump mechanism to close said valve said gear comprising a connection with the pump mechanism, a detachable connection to the stem of said valve, and means connected to and actuated by the source of water pressure for automatically engaging and detaching said gear to and from the valve stem.

3. A pressure regulator and cut-off for steam pumps consisting of a valve of the balance type which will balance when seated and be slightly unbalanced when not seated, means for unseating said valve and an automatic cut-off gear for said valve said gear comprising a connection with the pump mechanism, a detachable connection to the stem of said valve, and means connected to and actuated by the source of water pressure for automatically engaging and detaching said gear to and from the valve stem.

4. A pressure regulator and cut-off for steam pumps consisting of a valve adapted to open automatically by a decrease in the normal water pressure, a cut-off gear connected to the stem of said valve and operated by the reciprocating motion of the pump mechanism to close said valve, means operated by the source of water pressure to release the valve from said cut-off gear, and means for fending said gear from contact with the valve stem when the pump is working to supply pressure.

5. A pressure regulator and cut-off for steam pumps consisting of a valve opening automatically and having its stem connected to a cut-off gear, means for operating said gear by the pump mechanism to close said valve, a diaphragm actuated by the water pressure, means actuated by said diaphragm to release said cut-off gear from the valve stem, and means for fending said gear from the valve stem when the pump is working.

6. A pressure regulator and cut-off for pumps consisting of a valve adapted to open automatically, a cut-off gear connected to the stem of said valve and connected to and operated by the pump mechanism to close said valve, a diaphragm, a weighted arm, means connected to and operated by said diaphragm and arm to release said gear from the valve stem and fend said gear from contact with said stem when the pump is working to supply pressure.

7. A pressure regulator and cut-off for pumps consisting of a valve adapted to open automatically, a pivoted arm connected to the stem of said valve, means connecting said arm to the pump mechanism adapted to close said valve, a diaphragm connected to the source of water pressure, and automatic means attached to and operated by said diaphragm to connect and disconnect said pivoted arm to and from the pump mechanism.

8. A pressure regulator having its steam supply valve adapted to open by a decrease in the normal water pressure, a pivoted arm connected to the valve stem, a reciprocating rod operated by the pump mechanism adapted to close said valve, a diaphragm connected to the source of water pressure, and automatic means connected to and operated by said diaphragm to release and fend said reciprocating rod from contact with said arm when the water pressure is below normal.

9. A pressure regulator consisting of a valve in the steam feed pipe opened automatically by a decrease in the normal water pressure, a pivoted arm connected to the valve stem, a latch engaging said arm, a reciprocating rod operated by the pump mechanism to close said valve, a diaphragm connected to the source of water pressure, a weighted arm bearing upon said diaphragm and contacting with said latch to disengage the same from said pivoted arm, and means for fending said latch from contact with said arm while the pump is working to supply pressure.

10. In combination, a steam pump, a pressure tank or stand pipe, a pressure regulator, and a cut-off for said pump consisting of a valve in the steam feed pipe, means operated by the pump mechanism engaging the stem of said valve to close the valve, and means connected to and controlled by the pressure in said tank or pipe to automatically engage and disengage said cut-off to and from the valve stem.

In testimony whereof I affix my signature in presence of two witnesses.

ARTHUR UNDERWOOD.

Witnesses:
 FRANCIS S. MAGUIRE,
 W. A. REDMOND.